US009464888B2

(12) United States Patent
Huang et al.

(10) Patent No.: US 9,464,888 B2
(45) Date of Patent: Oct. 11, 2016

(54) METHOD AND APPARATUS FOR SENSING BOUNDARY BETWEEN MATERIALS

(71) Applicant: NATIONAL APPLIED RESEARCH LABORATORIES, Hsinchu (TW)

(72) Inventors: Chun-Ming Huang, Hsinchu (TW); Chen-Chia Chen, Hsinchu (TW); Yung-Bin Lin, Hsinchu (TW); Chien-Ming Wu, Hsinchu (TW)

(73) Assignee: National AppliedResearch Laboratories, Hsinchu (TW)

( * ) Notice: Subject to any disclaimer, the term of this patent is extended or adjusted under 35 U.S.C. 154(b) by 344 days.

(21) Appl. No.: 14/090,617

(22) Filed: Nov. 26, 2013

(65) Prior Publication Data

US 2015/0054677 A1 Feb. 26, 2015

(30) Foreign Application Priority Data

Aug. 23, 2013 (TW) .............................. 102130309 A

(51) Int. Cl.
*G01S 13/89* (2006.01)
*G01B 15/00* (2006.01)
*G01B 7/004* (2006.01)

(52) U.S. Cl.
CPC ............... *G01B 15/00* (2013.01); *G01B 7/004* (2013.01)

(58) Field of Classification Search
CPC ........ G01S 13/885; G01V 3/12; G01V 3/30; G01B 15/00; G01B 7/004
USPC ................................................. 342/22, 125
See application file for complete search history.

(56) References Cited

U.S. PATENT DOCUMENTS

| 4,814,768 A * | 3/1989 | Chang ................. G01S 13/0209 324/333 |
| 6,531,881 B1 * | 3/2003 | Cordes .................... G01B 15/02 324/637 |
| 8,096,355 B2 * | 1/2012 | McDaniel ............... E21B 43/26 166/250.1 |
| 2004/0004554 A1 * | 1/2004 | Srinivasan ............. G01D 9/005 340/870.01 |
| 2006/0097906 A1 * | 5/2006 | Heide ...................... G01S 7/032 342/22 |
| 2012/0274330 A1 * | 11/2012 | Kesar ...................... G01S 13/04 324/338 |
| 2014/0257704 A1 * | 9/2014 | Liu ................... E21B 47/02216 702/8 |
| 2015/0088426 A1 * | 3/2015 | Tang ........................ G01V 3/24 702/7 |

\* cited by examiner

*Primary Examiner* — John B Sotomayor
*Assistant Examiner* — Marcus Windrich
(74) *Attorney, Agent, or Firm* — Juan Carlos A. Marquez; Marquez IP Law Office

(57) ABSTRACT

A method and apparatus for sensing boundaries between materials are provided. The method for sensing boundaries between materials comprises the steps of: fixing sensing modules in place; transmitting and receiving radio frequency signals; and analyzing radio frequency signals. The method enables real-time detection of positions of the boundaries between materials and handling and monitoring of changes in the boundary positions. The apparatus for sensing boundaries between materials comprises at least two sensing modules, or a radio frequency transmitting unit and a plurality of radio frequency signals receiving unit, or a plurality of radio frequency transmitting unit and a radio frequency signals receiving unit. The radio frequency signals are transmitted, received and analyzed by the radio frequency transmitting unit and the radio frequency signals receiving unit to determine the boundary positions and changes therein.

13 Claims, 10 Drawing Sheets

METHOD AND APPARATUS FOR SENSING BOUNDARY BETWEEN MATERIALS

BACKGROUND OF THE INVENTION

1. Technical Field

The present invention relates to methods and apparatuses for sensing boundaries between materials, and more particularly, to a sensing method and apparatus for detecting positions of boundaries between at least two layers of materials and detecting changes in the boundary positions.

2. Description of Related Art

The sensing of boundaries between materials represents a monitoring or detecting technique which is usually ignored by the disaster prevention industry nowadays, and its main cause lies in a lack of a simple, stable and effective technique for effectuating the sensing of boundaries between materials.

In Taiwan, plenty of bridge failures, casualties, and property loss are caused by typhoons and earthquakes each year. According to statistics released by Taiwan's Directorate General of Highways, there are currently 10491 bridges in Taiwan, and some of which are old and poorly maintained, thus posing a safety risk. Hence, it is necessary to install a safety monitoring system on every bridge to prevent casualties and property loss which might otherwise be caused by bridge collapses as a result of natural disasters.

However, the installation of a safety monitoring system on every bridge in Taiwan does pose many challenges, for example, whether the safety monitoring system is sufficiently stable, and whether its manufacturing cost is low enough to justify its wide application.

What the safety monitoring system monitors substantially includes abutment scour, abutment tilt, and bridge displacement. Among these, abutment scour monitoring is most demanding, because a sensing apparatus for use in abutment scour monitoring has to be directly installed on the river bed. However, in hazardous waters, for example, turbulent waters, and rivers with floating wood, rocks, or muddy water, a conventional abutment scour sensor is susceptible to ambient interference, and is even likely to be hit by foreign bodies and thus get damaged. As a result, performing abutment scour monitoring persistently in hazardous waters for a long period of time is an important but demanding task. In view of this, it is imperative to provide a kind of low-cost sensing apparatuses to be extensively deployed in an adverse environment for long-term surveillance with a view to enhancing bridge safety. To this end, a material boundary sensing apparatus and method are required.

BRIEF SUMMARY OF THE INVENTION

The present invention discloses a method and apparatus for sensing boundaries between materials. The method for sensing boundaries between materials comprises the steps of: fixing sensing modules in place; transmitting and receiving radio frequency signals; and analyzing radio frequency signals. The method enables real-time detection of positions of the boundaries between materials and handling and monitoring of changes in the boundary positions. The apparatus for sensing boundaries between materials comprises at least two sensing modules, or a radio frequency transmitting unit and a plurality of radio frequency signals receiving unit, or a plurality of radio frequency transmitting unit and a radio frequency signals receiving unit. The radio frequency signals are transmitted, received and analyzed by the radio frequency transmitting unit and the radio frequency signals receiving unit to determine the boundary positions and changes therein.

The present invention discloses a method for sensing boundaries between materials, comprising the steps of: applying sensing modules, including fixing at least two said sensing modules vertically to at least one material, at least a said sensing module being disposed in the said material, the sensing modules each comprising a radio frequency signals transmitting unit and a radio frequency signals receiving unit, wherein the radio frequency signals transmitting unit and the radio frequency signals receiving unit are located at different positions in the material and correspond horizontally to each other; transmitting and receiving radio frequency signals, including transmitting the radio frequency signals from each of the radio frequency signals transmitting units and receiving the radio frequency signals by a corresponding one of the radio frequency signals receiving units; and analyzing radio frequency signals, including analyzing amplitude or phase of the radio frequency signals received by each of the radio frequency signals receiving units, and sensing or monitoring a boundary position or changes of boundary position in said material or between two adjacent said materials.

The present invention discloses a method for sensing boundaries between materials, comprising the steps of: applying a radio frequency transmission signals unit and radio frequency signals receiving units, including fixing a said radio frequency signals transmitting unit and a plurality of the radio frequency signals receiving units vertically to at least two materials vertically adjoined, respectively, at least a said radio frequency signals receiving unit being fixed to each of the materials; transmitting and receiving radio frequency signals, including transmitting the radio frequency signals from the radio frequency signals transmitting unit and receiving the radio frequency signals by the radio frequency signals receiving units; and analyzing radio frequency signals, including analyzing amplitude or phase of the radio frequency signals received by each of the radio frequency signals receiving units, and sensing or monitoring a boundary position or changes of boundary position in said material or between two adjacent said materials.

The present invention further discloses an apparatus for sensing boundaries between materials, comprising at least two sensing modules fixed to at least two materials adjoined, respectively, at least a said sensing module being disposed in each said material, wherein the sensing modules each have a radio frequency signals transmitting unit and a radio frequency signals receiving unit, wherein the radio frequency signals transmitting unit and the radio frequency signals receiving unit are located at different positions in the same materials and correspond horizontally to each other, the radio frequency signals receiving unit receiving radio frequency signals transmitted from the radio frequency signals transmitting unit, analyzing the radio frequency signals, and sensing or monitoring a boundary position between two adjacent said materials or changes in the boundary position.

The present invention further discloses an apparatus for sensing boundaries between materials, comprising a radio frequency signals transmitting unit and a plurality of radio frequency signals receiving units fixed to at least two materials adjoined, respectively, at least one said radio frequency signals receiving unit being fixed to each of the materials for receiving radio frequency signals transmitted from the radio frequency signals transmitting unit, analyzing the radio frequency signals, and sensing or monitoring a boundary position between two adjacent said materials or changes in the boundary position.

The present invention further discloses an apparatus for sensing boundaries between materials, comprising a plurality of radio frequency signals transmitting units and a radio frequency signals receiving unit fixed to at least two materials adjoined, respectively, wherein at least one said radio frequency signals transmitting unit is fixed to each of the materials, the radio frequency signals transmitting units transmitting radio frequency signals, the radio frequency signals receiving unit receiving and analyzing the radio frequency signals, and sensing or monitoring a boundary position between two said adjacent materials or changes in the boundary position.

The present invention further discloses an apparatus for sensing boundaries between materials, comprising at least two sensing modules fixed to at least two materials adjoined, respectively, wherein the sensing modules each have a radio frequency signals transmitting unit and a radio frequency signals receiving unit, the radio frequency signals receiving unit receiving a radio frequency signal transmitted from the radio frequency signals transmitting unit and reflected off a block, analyzing the radio frequency signal, and sensing or monitoring a state of the block.

Implementation of the present invention at least involves the following inventive steps:

1. It enables the material boundary sensing apparatus to be manufactured and installed quickly, easily, and cheaply;

2. It enables real-time detection of changes in positions of boundaries between materials; and 3. It applies to real-time disaster detection and surveillance and thus reduces casualties and property loss caused by natural disasters.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
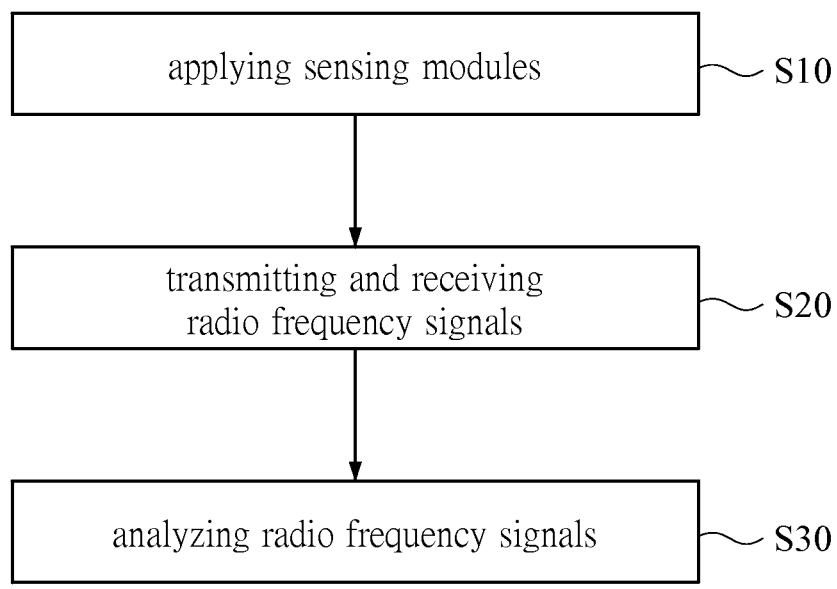
FIG. 1 is a schematic view of the process flow of a method for sensing boundaries between materials according to an embodiment of the present invention.

Referring to FIG. 1, in an embodiment, a method S100 for sensing boundaries between materials comprises the steps of: applying sensing modules (step S10); transmitting and receiving radio frequency signals (step S20); and analyzing radio frequency signals (step S30).

Figure 3:
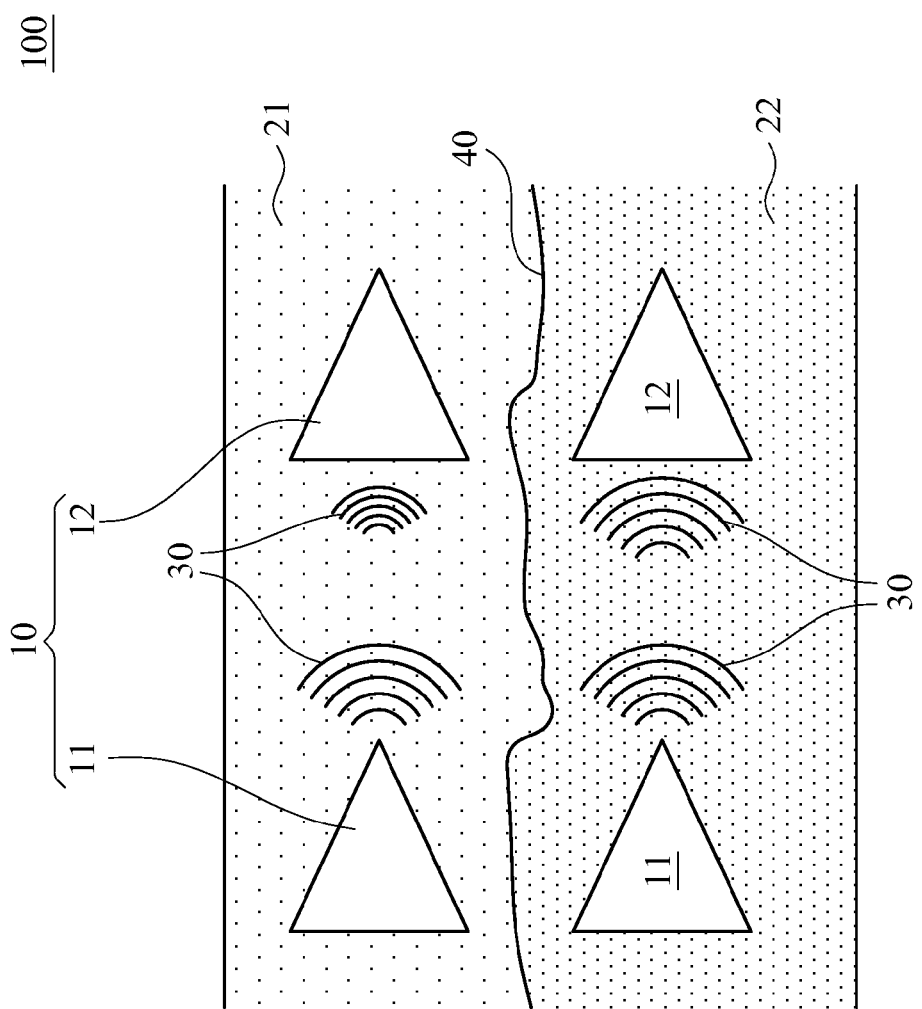
FIG. 3 is a schematic view of an apparatus for sensing boundaries between materials according to an embodiment of the present invention.

Referring to FIG. 1 and FIG. 3, the step of applying sensing modules (step S10) entails fixing at least two sensing modules 10 vertically to at least two materials of material 21, material 22 and material 23 vertically adjoined. At least one said sensing module 10 is fixed to each of material 21, material 22 or material 23. The sensing modules 10 each comprise a radio frequency signals transmitting unit 11 and a radio frequency signals receiving unit 12. The radio frequency signals transmitting unit 11 and the radio frequency signals receiving unit 12 are located at different positions in the same material, namely material 21, material 22 or material 23, and correspond horizontally to each other.

Referring to FIG. 1 and FIG. 3, the step of transmitting and receiving radio frequency signals (step S20) entails transmitting radio frequency signals 30 from each of the radio frequency transmitting units 11 and receiving the radio frequency signals 30 by a corresponding one of the radio frequency signals receiving units 12.

Referring to FIG. 1 and FIG. 3, in the step of analyzing radio frequency signals (step S30), the radio frequency signals receiving units 12 each analyze the amplitude or phase of the radio frequency signals 30 and sense or monitor a boundary position 40 between adjacent materials 2X or changes in the boundary position 40.

Figure 4:
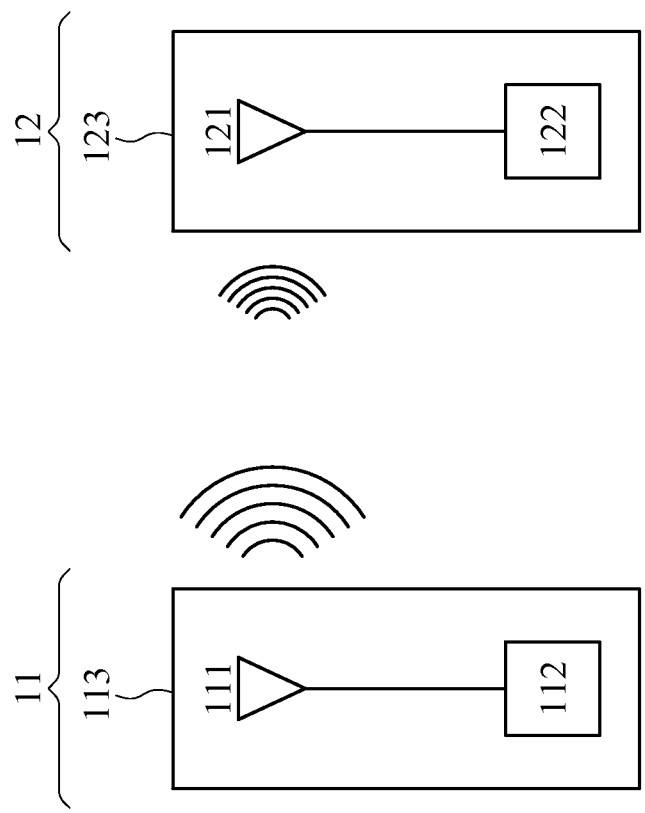
FIG. 4 is a schematic view of a sensing module according to an embodiment of the present invention.

Referring to FIG. 1, FIG. 3 and FIG. 4, as regards the method S100 for sensing boundaries between materials, the radio frequency signals transmitting unit 11 has a first antenna 111, a control unit 112, and a first carrier 113, whereas the radio frequency signals receiving unit 12 has a second antenna 121, an analyzing unit 122, and a second carrier 123.

The radio frequency signals transmitting unit 11 has a first antenna 111, a control unit 112, and a first carrier 113. The first antenna 111 and the control unit 112 are disposed in the first carrier 113 in a hermetically sealed manner to thereby prevent the first antenna 111 and the control unit 112 from being damaged or affected by materials 2X. The control unit 112 controls the first antenna 111 to transmit the radio frequency signals 30. The first carrier 113 is penetrable by the radio frequency signals 30.

The radio frequency signals receiving unit 12 receives the radio frequency signals 30 transmitted from the radio frequency signals transmitting unit 11 and analyzes the radio frequency signals 30 to thereby sense or monitor the boundary position 40 between adjacent materials 2X or changes in the boundary position 40.

The radio frequency signals receiving unit 12 has a second antenna 121, an analyzing unit 122, and a second carrier 123. The second antenna 121 and the analyzing unit 122 are disposed in the second carrier 123 in a hermetically sealed manner to thereby prevent the second antenna 121 and the analyzing unit 122 from being damaged or affected by materials 2X. The analyzing unit 122 controls the second antenna 121 to receive the radio frequency signals 30 transmitted from the first antenna 111, analyzes the radio frequency signals 30, and processes the radio frequency signals 30, so as to sense or monitor the boundary position 40 or changes of the boundary position 40 inside one material 2X or between two adjacent materials 2X. Wherein the second carrier 123 is penetrable by the radio frequency signals 30.

The radio frequency signals 30 are of a fixed frequency or of at least two frequencies. The radio frequency signals 30 are each a continuous wave or a pulse. The continuous wave is a non-modulation continuous wave, an intermittent continuous wave, a phase modulation continuous wave, a frequency modulation continuous wave, or an amplitude modulation continuous wave. The pulse is a periodic pulse, a phase modulation pulse, or a frequency modulation pulse.

Figure 2:
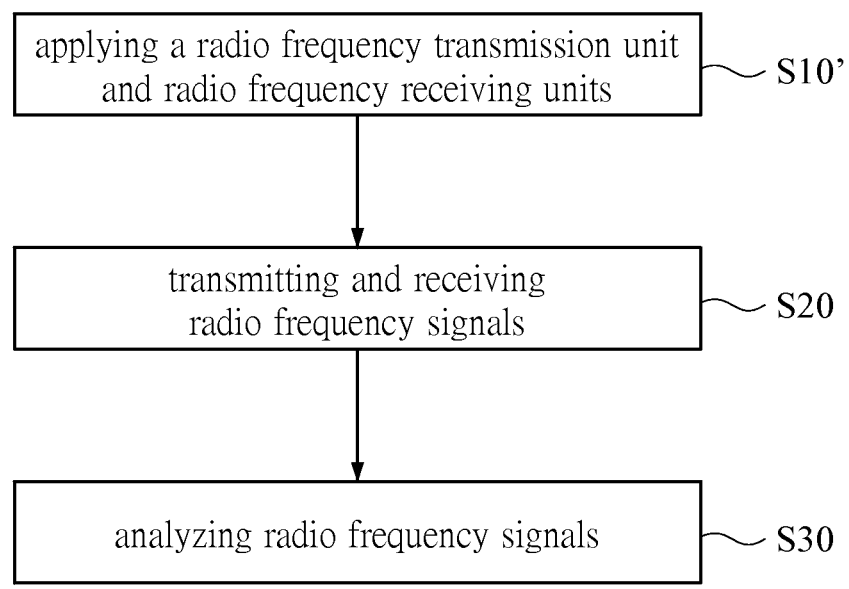
FIG. 2 is a schematic view of the process flow of another method for sensing boundaries between materials according to an embodiment of the present invention.

Referring to FIG. 2, in an embodiment, another material boundary sensing method S200 comprises the steps of: applying a radio frequency transmission unit and radio frequency signals receiving units (step S10'); transmitting and receiving radio frequency signals (step S20); and analyzing radio frequency signals (step S30).

Figure 6:
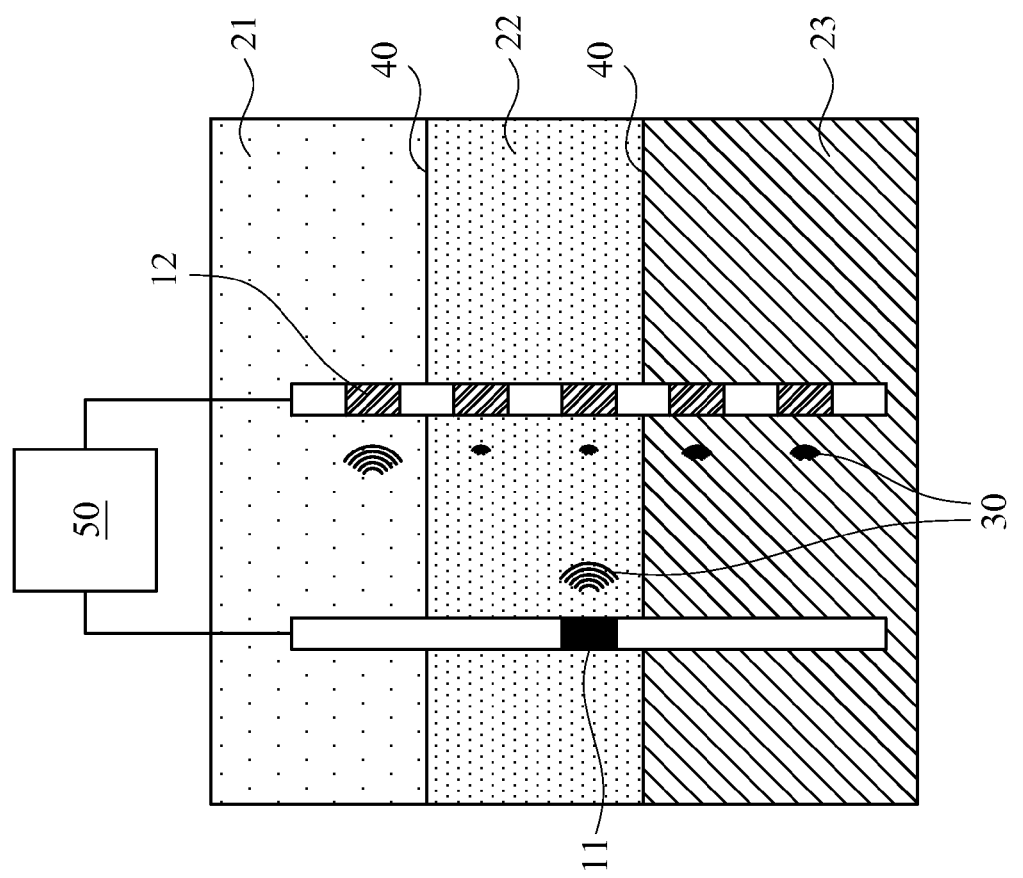
FIG. 6 is a schematic view of another sensing module and another monitoring module according to an embodiment of the present invention.

Referring to FIG. 2 and FIG. 6, the step of applying a radio frequency transmission unit and radio frequency signals receiving units (step S10') entails fixing a radio frequency signals transmitting unit 11 and a plurality of radio frequency signals receiving units 12 vertically to at least two materials 2X vertically adjoined, respectively. At least one said radio frequency signals receiving unit 12 is fixed to each of the at least two materials 2X.

Referring to FIG. 1 and FIG. 2, the step of transmitting and receiving radio frequency signals (step S20) and the step of analyzing radio frequency signals (step S30) of the material boundary sensing method S200 are the same as the steps of the method S100 for sensing boundaries between materials and thus are not described again herein for the sake of brevity.

Referring to FIG. 2, as regards the material boundary sensing method S200, a single radio frequency signals transmitting unit 11 transmits the radio frequency signals 30, and a plurality of radio frequency signals receiving units 12 receives the radio frequency signals 30, so as to sense or monitor the boundary position 40 or changes of the boundary position 40 inside one material 2X or between two adjacent materials 2X.

Referring to FIG. 3, in an embodiment, a material boundary sensing apparatus 100 comprises at least two sensing modules 10 fixed to at least two materials 2X adjoined, respectively, (where 2X denotes 21, 22, . . . , and X denotes a positive integer).

Figure 5:
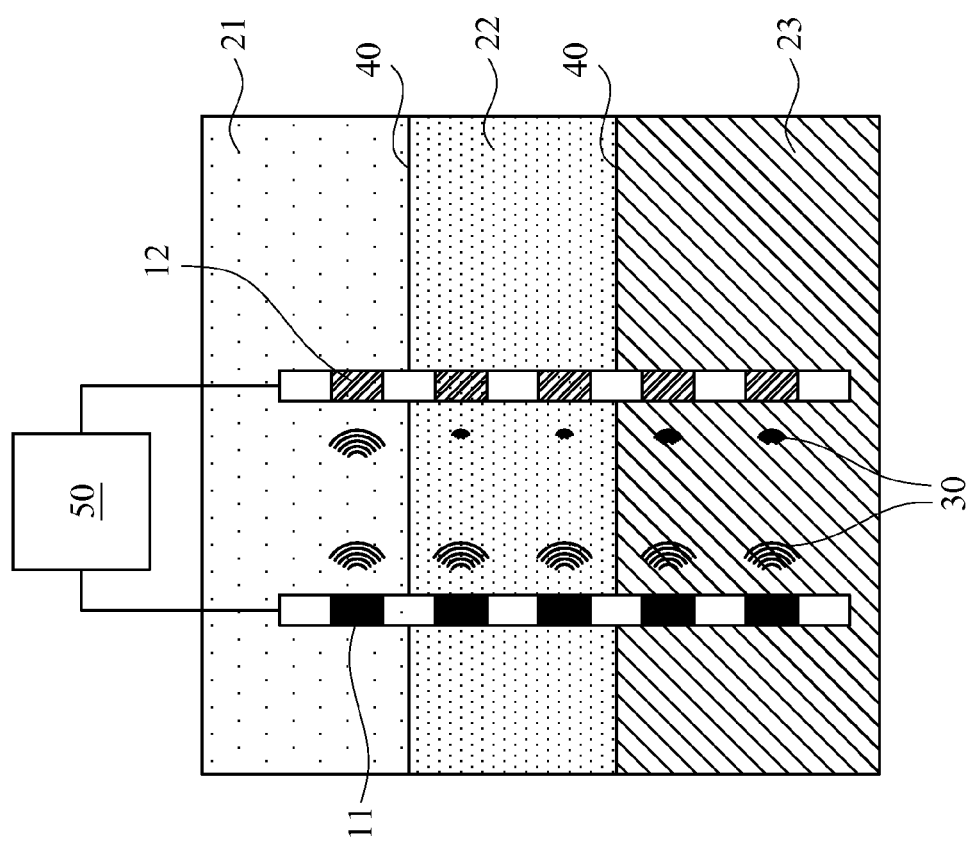
FIG. 5 is a schematic view of a sensing module and a monitoring module according to an embodiment of the present invention.

Referring to FIG. 3 through FIG. 5, at least one said sensing module 10 is disposed in each of the at least two materials 2X, and the sensing modules 10 each have a radio frequency signals transmitting unit 11 and a radio frequency signals receiving unit 12. The radio frequency signals transmitting unit 11 and the radio frequency signals receiving unit 12 are located at different positions in the same materials 2X and correspond horizontally to each other. The correlation and features of the radio frequency signals transmitting unit 11 and the radio frequency signals receiving unit 12 are described before and thus are not described again herein.

Figure 10:
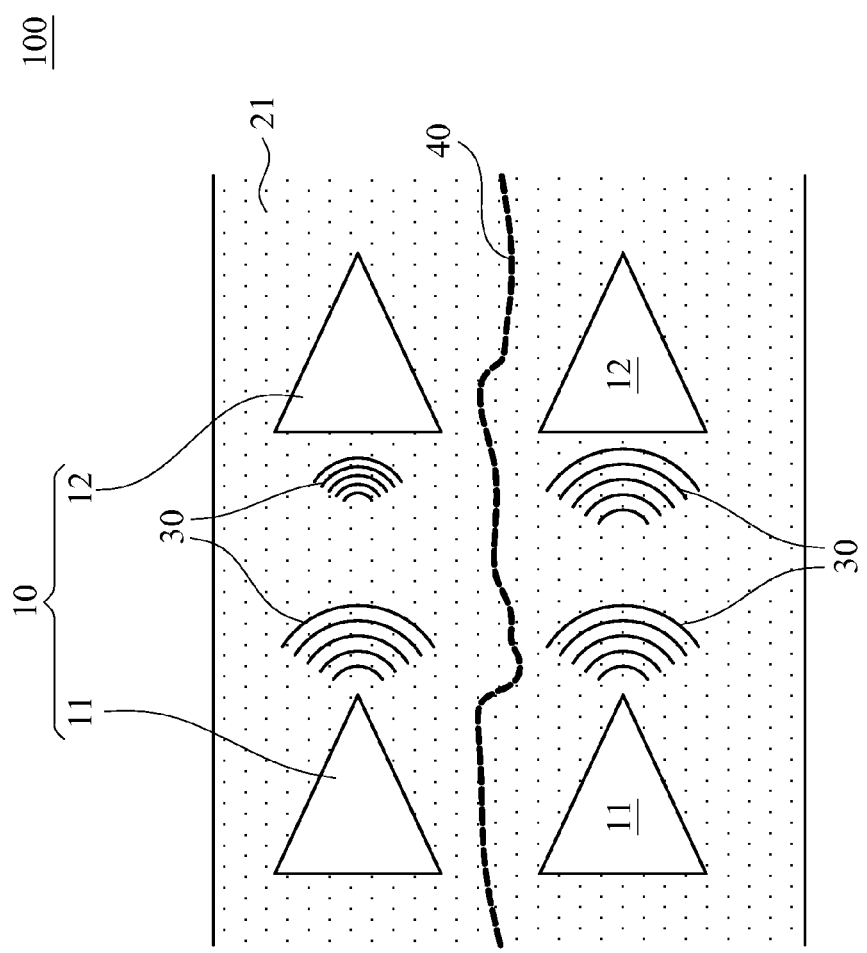
FIG. 10 is a schematic view of an apparatus for sensing a boundary inside a material according to an embodiment of the present invention.

Furthermore, please also refer to FIG. 10, in this embodiment the said at least one sensing module 10 can also be disposed in only one material 21. Through analysis of the radio frequency signals received by adjacent radio frequency signals receiving unit 12, the existence or lacking of existence of the boundary position 40 can be decided.

Referring to FIG. 3 through FIG. 5 and FIG. 10, the radio frequency signals 30 are of a fixed frequency or of at least two frequencies. The radio frequency signals 30 are each a continuous wave or a pulse. The continuous wave is a non-modulation continuous wave, an intermittent continuous wave, a phase modulation continuous wave, a frequency modulation continuous wave, or an amplitude modulation continuous wave. The pulse is a periodic pulse, a phase modulation pulse, or a frequency modulation pulse.

Referring to FIG. 4 and FIG. 5, the quantity of the sensing modules 10 in each of materials 2X is variable as needed, and the distance between the radio frequency signals transmitting unit 11 and the radio frequency signals receiving unit 12 of each said sensing module 10 is variable as needed. The radio frequency signals transmitting unit 11 and the radio frequency signals receiving unit 12 of the sensing module 10 are disposed in the first carrier 113 and the second carrier 123, respectively, in a hermetically sealed manner to thereby be insusceptible to environmental interference and damage.

Referring to FIG. 3 through FIG. 5, in an embodiment, as regards the material boundary sensing apparatus 100, the amplitude of the radio frequency signals 30 received by the radio frequency signals receiving unit 12 decreases, as the electrical conductivity of materials 2X increases, whereas the distance-dependent attenuation coefficient of the radio frequency signals 30 varies from materials 2X to materials 2X. Phase shift of the radio frequency signals 30 varies from materials 2X to materials 2X. During the process in which the radio frequency signals 30 are passing through different materials 2X, the phase and amplitude of the radio frequency signals 30 vary from materials 2X to materials 2X. By the aforesaid principles, the analyzing unit 122 analyzes materials 2X in the vicinity of the sensing module 10 and determines whether there is any change in the boundary position 40 inside one material 2X or between materials 2X.

In general, the amount of the radio frequency signals 30 absorbed by materials 2X depends on the frequency of the radio frequency signals 30. It is likely for materials 2X to be wrongly sensed by the radio frequency signals 30 of a single frequency. Hence, materials 2X are sensed by the radio frequency signals 30 of multiple frequencies to enhance the accuracy in the sensing of materials 2X or changes therein.

Referring to FIG. 5 through FIG. 9, the radio frequency signals 30 pass through different materials 2X, such as air 21, water 22, or soil on river bed 23, as shown in the diagrams, resulting in different degree of attenuation and delay of the radio frequency signals 30. The attenuation is variation of amplitude, whereas the delay is variation of phase.

Figure 7:
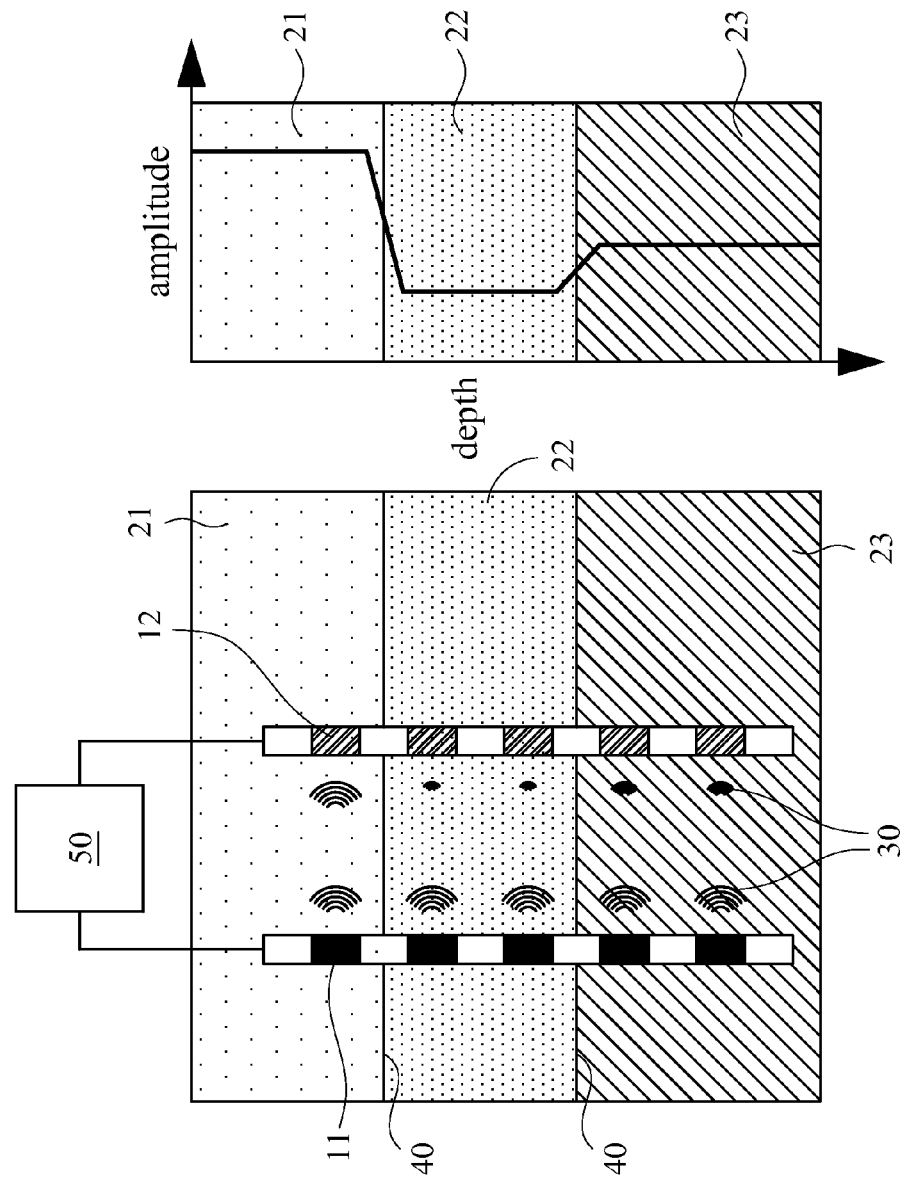
FIG. 7 is a schematic view of the amplitude of radio frequency signals in different materials according to an embodiment of the present invention.

Referring to the diagram on the right portion of FIG. 7, the radio frequency signals 30 of the same amplitude are transmitted from the radio frequency signals transmitting unit 11 to pass through different materials 2X (air 21, water 22, and river bed 23), resulting in variation of the amplitude of the radio frequency signals 30 received by the radio frequency signals receiving unit 12.

The analyzing unit 122 analyzes the amplitude and phase of the radio frequency signals 30 to determine whether materials 2X in the vicinity of the sensing module 10 are identical and thereby determine whether the boundary position 40 exists between materials 2X or whether materials 2X have already changed. The sensing module 10 is vertically or horizontally fixed in place in an environment (such as river water or soil) under test. The sensing module 10 transmits and receives the radio frequency signals 30 and analyzes the radio frequency signals 30 to thereby evaluate the distribution of materials 2X in the environment under test.

Referring to FIG. 6, the material boundary sensing apparatus 100 comprises only a radio frequency signals transmitting unit 11 and a plurality of radio frequency signals receiving units 12. The radio frequency signals transmitting unit 11 is fixed to one said material 2X. The radio frequency signals receiving units 12 are fixed to different said materials 2X, respectively. At least one said radio frequency signals receiving unit 12 is fixed to each of materials 2X. The radio frequency signals receiving units 12 receive the radio frequency signals 30 transmitted from the radio frequency signals transmitting unit 11, analyze the radio frequency signals 30, and sense or monitor the boundary position 40 or changes of the boundary position 40 inside one material 2X or between two adjacent materials 2X.

Referring to FIG. 5 through FIG. 9, the material 2X boundary sensing apparatus 100 further comprises a monitoring module 50 connected to a signal from a radio frequency signals transmitting unit 11 or a radio frequency signals receiving unit 12. The monitoring module 50 is a computer module which not only performs local or remote monitoring of the radio frequency signals transmitting unit 11 or the radio frequency signals receiving unit 12 but also sends analyzed data out of the material boundary sensing apparatus 100.

Figure 8:
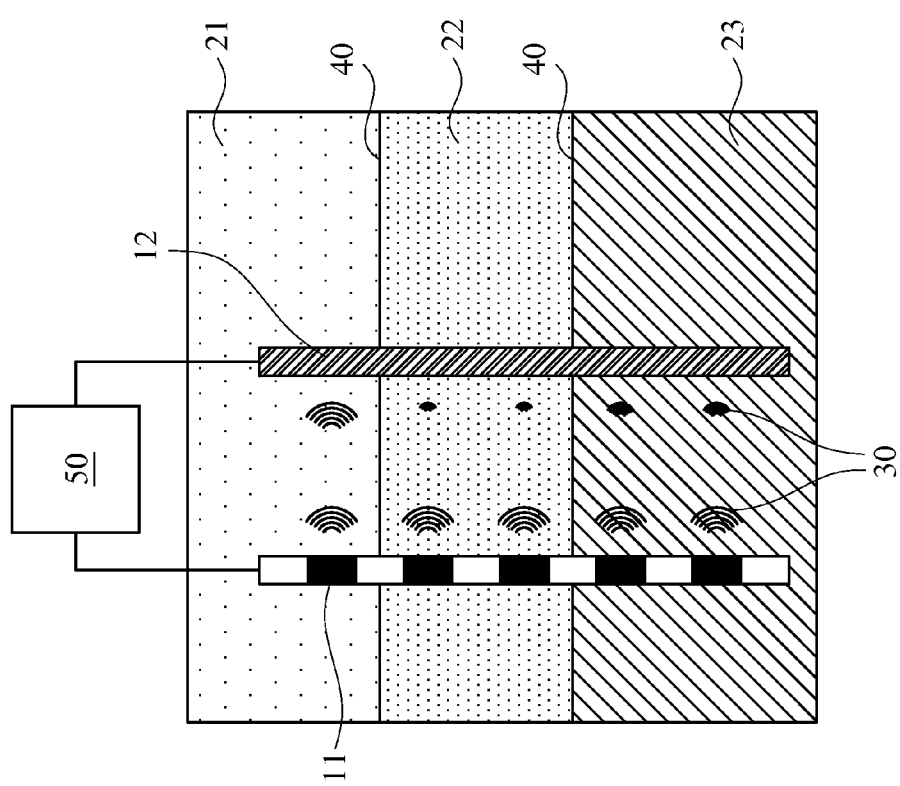
FIG. 8 is a schematic view of yet another sensing module and another monitoring module according to an embodiment of the present invention.

Referring to FIG. 8, the material boundary sensing apparatus 100 comprises a plurality of radio frequency transmitting units 11 and only has a radio frequency signals receiving unit 12. The radio frequency transmitting units 11 are fixed to at least one material 2X. The radio frequency signals receiving unit 12 is fixed to different materials 2X and extend therein. At least one said radio frequency signals transmitting unit 11 is fixed to each of materials 2X. The radio frequency transmitting units 11 transmit the radio frequency signals 30. The radio frequency signals receiving unit 12 receives and analyzes the radio frequency signals 30 and sense or monitor the boundary position 40 or changes of the boundary position 40 inside one material 2X or between two adjacent materials 2X.

Figure 9:
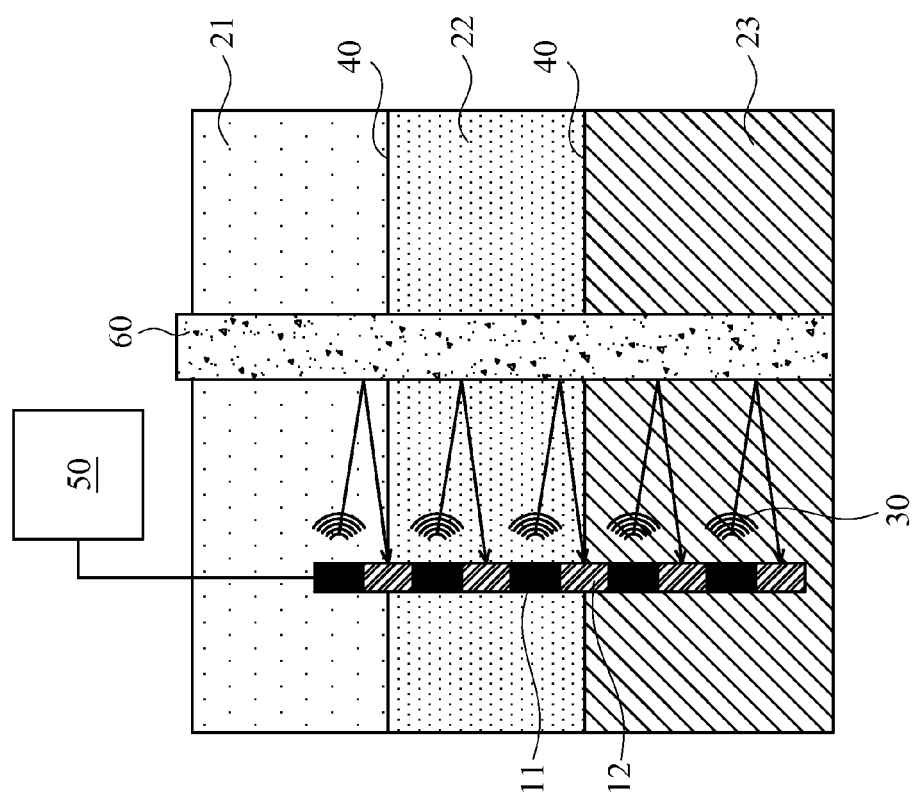
FIG. 9 is a schematic view of a further sensing module and a further monitoring module according to an embodiment of the present invention.

Referring to FIG. 9, as regards the material boundary sensing apparatus 100, the radio frequency signals transmitting unit 11 and the radio frequency signals receiving unit 12 are fixed in place on the same side, such that the radio frequency signals 30 transmitted from the radio frequency signals transmitting unit 11 is reflected off a block 60. Afterward, the radio frequency signals receiving unit 12 receives and analyzes the radio frequency signals 30 and and sense or monitor the boundary position 40 or changes of the boundary position 40 inside one material 2X or between two adjacent materials 2X.

Please refer to FIG. 9, in an embodiment, the block 60 is an electromagnetic wave reflecting body inserted by hand and adapted to reflect the radio frequency signals 30, or a darn, or an abutment.

The embodiments described above are intended only to demonstrate the technical concept and features of the present invention so as to enable a person skilled in the art to understand and implement the contents disclosed herein. It is understood that the disclosed embodiments are not to. limit the scope of the present invention. Therefore, all equivalent changes or modifications based on the concept of the present invention should be encompassed by the appended claims.

What is claimed is:

1. A method for sensing boundaries between materials, comprising the steps of:
    applying sensing modules, including fixing at least two said sensing modules vertically to at least one material, at least a said sensing module being disposed in the said material, the sensing modules each comprising a radio frequency signals transmitting unit and a radio frequency signals receiving unit, wherein the radio frequency signals transmitting unit and the radio frequency signals receiving unit are located at different positions in the material and correspond horizontally to each other;
    transmitting and receiving radio frequency signals, including transmitting the radio frequency signals from each of the radio frequency signals transmitting units and receiving the radio frequency signals reflected from a block by a corresponding one of the radio frequency signals receiving units; and
    analyzing radio frequency signals, including analyzing amplitude or phase of the radio frequency signals received by each of the radio frequency signals receiving units, and sensing or monitoring a boundary position or changes of boundary position in said material or between two adjacent said materials.

2. A method for sensing boundaries between materials, comprising the steps of:
    applying a radio frequency transmission signals unit and radio frequency signals receiving units, including fixing a said radio frequency signals transmitting unit and a plurality of the radio frequency signals receiving units vertically to at least two materials vertically adjoined, respectively, at least a said radio frequency signals receiving unit being fixed to each of the materials;
    transmitting and receiving radio frequency signals, including transmitting the radio frequency signals from the radio frequency signals transmitting unit and receiving the radio frequency signals reflected from a block by the radio frequency signals receiving units; and
    analyzing radio frequency signals, including analyzing amplitude or phase of the radio frequency signals received by each of the radio frequency signals receiving units, and sensing or monitoring a boundary position or changes of boundary position in said material or between two adjacent said materials.

3. The method of claim 1, wherein the radio frequency signals transmitting unit has a first antenna, a control unit, and a first carrier, wherein the first antenna and the control unit are disposed in the first carrier in a hermetically sealed manner, the control unit controlling the first antenna to transmit the radio frequency signals, and the first carrier being penetrable by the radio frequency signals.

4. The method of claim 1, wherein the radio frequency signals receiving unit has a second antenna, an analyzing unit, and a second carrier, wherein the second antenna and the analyzing unit are disposed in the second carrier in a hermetically sealed manner, the analyzing unit controlling the second antenna to receive the radio frequency signals, analyzing the radio frequency signals, and processing the radio frequency signals, and the second carrier being penetrable by the radio frequency signals.

5. The method of claim 1, wherein the radio frequency signals are each a continuous wave or a pulse, and the radio frequency signals are of a fixed frequency or of at least two frequencies mixed.

6. The method of claim 2, wherein the radio frequency signals transmitting unit has a first antenna, a control unit, and a first carrier, wherein the first antenna and the control unit are disposed in the first carrier in a hermetically sealed manner, the control unit controlling the first antenna to transmit the radio frequency signals, and the first carrier being penetrable by the radio frequency signals.

7. The method of claim 2, wherein the radio frequency signals receiving unit has a second antenna, an analyzing unit, and a second carrier, wherein the second antenna and the analyzing unit are disposed in the second carrier in a hermetically sealed manner, the analyzing unit controlling the second antenna to receive the radio frequency signals, analyzing the radio frequency signals, and processing the radio frequency signals, and the second carrier being penetrable by the radio frequency signals.

8. The method of claim 2, wherein the radio frequency signals are each a continuous wave or a pulse, and the radio frequency signals are of a fixed frequency or of at least two frequencies mixed.

9. An apparatus for sensing boundaries between materials, comprising at least two sensing modules fixed to at least two materials adjoined, respectively, wherein the sensing modules each have a radio frequency signals transmitting unit and a radio frequency signals receiving unit, the radio frequency signals receiving unit receiving a radio frequency signal transmitted from the radio frequency signals transmitting unit and reflected off a block, analyzing the radio frequency signal, and sensing or monitoring a state of the block.

10. The apparatus of claim 9, wherein the radio frequency signals transmitting unit has a first antenna, a control unit, and a first carrier, wherein the first antenna and the control unit are disposed in the first carrier in a hermetically sealed manner, the control unit controlling the first antenna to transmit the radio frequency signals, and the first carrier being penetrable by the radio frequency signals.

11. The apparatus of claim 9, wherein the radio frequency signals receiving unit has a second antenna, an analyzing unit, and a second carrier, wherein the second antenna and the analyzing unit are disposed in the second carrier in a hermetically sealed manner, the analyzing unit controlling the second antenna to receive the radio frequency signals, analyzing the radio frequency signals, and processing the radio frequency signals, and the second carrier being penetrable by the radio frequency signals.

12. The apparatus of claim 9, wherein the radio frequency signals are each a continuous wave or a pulse, and the radio frequency signals are of a fixed frequency or of at least two frequencies mixed.

13. The apparatus of claim 9, further comprising a monitoring module connected to a signal from the radio frequency signals transmitting unit or the radio frequency signals receiving unit.

* * * * *